United States Patent

Liska et al.

[15] 3,643,130

[45] Feb. 15, 1972

[54] SUPERVISORY DEVICE FOR RECTIFIER HAVING SEMICONDUCTOR VALVE-TYPE COMPONENTS

[72] Inventors: Manfred Liska; Klaus Hubner, both of Munich, Germany

[73] Assignee: Siemens Aktiengesellschaft, Berlin and Munich, Germany

[22] Filed: May 20, 1970

[21] Appl. No.: 39,079

[30] Foreign Application Priority Data

May 31, 1969 Germany ......................P 19 27 826.3

[52] U.S. Cl. ............................317/40 R, 317/27 R, 322/32, 321/11

[51] Int. Cl. ........................................................H02h 7/10

[58] Field of Search .........................317/27, 40; 322/24, 32; 321/11, 14, 21, 24

[56] References Cited

UNITED STATES PATENTS 3,375,433 3/1968 Haggerty ................................322/32

*Primary Examiner*—William M. Shoop, Jr.
*Assistant Examiner*—Harvey Fendelman
*Attorney*—Curt M. Avery, Arthur E. Wilfond, Herbert L. Lerner and Daniel J. Tick

[57] ABSTRACT

A thermal replica has an RC component having a variable resistance and a capacitor connected to the resistance. The variable resistance is dependent upon the operating frequency of a rectifier having semiconductor valve-type components to an extent that the median value of the resistance increases with decreasing operating frequency when the variable resistance is connected in parallel with the capacitor and decreases with decreasing operating frequency when the variable resistance is connected in series with the capacitor. A current proportional to the current supplied to the rectifier is supplied to the thermal replica. A signal generator coupled to the capacitor responds when the voltage of the capacitor reaches a specific critical level.

10 Claims, 3 Drawing Figures

SUPERVISORY DEVICE FOR RECTIFIER HAVING SEMICONDUCTOR VALVE-TYPE COMPONENTS

The invention relates to a rectifier having semiconductor valve-type components. More particularly, the invention relates to a supervisory device for a rectifier having semiconductor valve-type components.

The invention relates to a supervisory device for a rectifier having semiconductor valves such as, for example, diodes, thyristors, semiconductor controlled rectifiers, or the like valve-type components. The supervisory device of the invention comprises a thermal replica having at least one RC component. The RC component is supplied with current proportional to the current supplied to or derived from the rectifier. The supervisory device also comprises a signal generator. The voltage at the capacitor of the RC component is applied to the signal generator. The signal generator responds when the voltage of the RC component reaches a specified critical level.

A known type of supervisory device such as, for example, that disclosed in German Pat. No. 1,108,317, is based upon the recognition that the thermal behavior of a valve-type semiconductor device of a rectifier, charged by at least one RC component with a current proportional to the current supplied to or derived from said rectifier, may be approximated. The voltage at the capacitor of the RC component is an indication or measurement of the heating of the critical part of the semiconductor device. That is, the capacitor voltage is an indication of the heating of the barrier layer of the actual semiconductor device.

The voltage of the capacitor of the RC component may thus be utilized to control a signal generator or flip-flop circuit which responds to a specific critical level of said voltage and produces a signal, or induces the disconnection or deenergization of the rectifier device. If the RC component is appropriately rated and adjusted to the semiconductor valves utilized, and if the sensitivity limit of the flip-flop circuit is appropriately determined, it is feasible that the flip-flop circuit responds when the heating of the semiconductor valves exceeds a specific safety level.

A prerequisite for error-free operation of a supervisory device of the aforedescribed type is that a specific maximum current flow period within the individual branches of the rectifier not be reliably exceeded. The prerequisite is always met when the rectifier operates at a substantially constant operating frequency. The current which flows through the individual branches of the rectifier and which determines the heating of the semiconductor valves in the branches of the rectifier, has a magnitude which is dependent only upon one variable. That is, the current magnitude is dependent only upon the current supplied to or derived from the rectifier.

The condition that the magnitude of the current in the individual branches of the rectifier, and which determines the heating of the semiconductor valves in said branches, is dependent only on the current supplied to or derived from the rectifier, is no longer fulfilled if the operating frequency of the rectifier, energizing a driving machine, must be varied within a very wide range. If, in a borderline situation, the operating frequency is zero, the entire current flows to the rectifier via a single branch of the rectifier, instead of commutating in sequence, from one rectifier branch to another. The problem is magnified by the fact that the current received by such a rectifier increases when the operating frequency decreases, since the counteracting electromotive force decreases.

The aforediscussed problem may be resolved by rating the semiconductor valves in the individual branches of the rectifier for the current which flows during the entire critical period, that is including the time that the operating frequency equals zero. Such a solution would be uneconomical.

The principal object of the invention is to provide a new and improved supervisory device for rectifier having semiconductor valve-type components.

An object of the invention is to provide a supervisory device for a rectifier having semiconductor valve-type components, which device overcomes the disadvantages of known types of device.

An object of the invention is to provide a supervisory device for a rectifier having semiconductor valve-type components, which device provides an essentially correct rating of the thermal conditions of a rectifier comprising semiconductor valves and having a variable frequency.

An object of the invention is to provide a supervisory device for a rectifier having semiconductor valve-type components, which device provides an essentially accurate rating of the thermal conditions of a rectifier having semiconductor valves and a variable operating frequency, which rating is for the most frequently occurring instance of normal rated operation.

An object of the invention is to provide a supervisory device for a rectifier having semiconductor valve-type components, which device functions with efficiency, effectiveness and reliability.

In accordance with the invention, a variable resistor is connected in parallel with the capacitor of the RC component, or in series with said capacitor. The resistance of the variable resistor is so dependent on the control of the operating frequency of the rectifier, that its median value increases at a decrease in said operating frequency when said resistor is connected in parallel with the capacitor, and its median value decreases at a decrease in the operating frequency when said resistor is connected in series with said capacitor.

If the supervisory device of the invention is so rated that the signal generator responds when the current I supplied to the rectifier reaches a specific upper critical level $I_G$ for each rectifier branch during a predetermined period of operation $t_G$, then the control or supervisory device is probably so designed for the resistor that the median value of the resistance of said resistor decreases by the root of a current flow time period $t_p$, when said resistor is in parallel connection, and increases, when said resistor is in series connection. The period $t_p$ indicates the period during which current flows in the individual branches of the rectifier. This insures a reliable response of the signal generator when the magnitude of the current flowing through the individual branches of the rectifier, which determines the heating of the semiconductor valves, exceeds the rated critical value, at an arbitrary combination of amplitude and current flow duration.

The variable resistor may comprise a transistor. If a voltage is available for the control of the transistor, and the voltage is proportional to the current flow time in the individual branches of the rectifier, the desired control dependency may be effected by known combinations of diodes and resistors connected on the supply side of the control path the the transistor.

The resistor may be varied discontinuously between two fixed limit values of resistance by means of switching, whereby the median value will depend upon the ratio of the time intervals by the median value will depend upon the ratio of the time intervals during which one or the other limit value becomes effective. Thus, for example, the selected resistor may be a transistor having a rigidly fixed control which provides another constant value during the reset time of a monostable flip-flop circuit. The input of the flip-flop circuit may then be connected to all the outputs of the control unit, controlling the rectifier, via an OR gate.

In accordance with the invention, a supervisory device for a rectifier having semiconductor valve-type components comprises a thermal replica having an RC component having variable resistance means and a capacitor connected to the variable resistance means. The variable resistance means is dependent upon the operating frequency of the rectifier to an extent that the median value of the variable resistance means increases with decreasing operating frequency when the variable resistance means is connected in parallel with the capacitor and decreases with decreasing operating frequency when the variable resistance means is connected in series with the capacitor. Current supply means coupled to the rectifier supplies a current to the rectifier. Current means coupled between the current supply means and the thermal replica supplies to the thermal replica a current proportional to the current supplied to the rectifier. A signal generator having an input coupled to the capacitor of the RC component of the thermal replica responds when the voltage of the capacitor reaches a specific critical level.

The rectifier has a plurality of branches and the resistance value of the variable resistance means of the RC component of the thermal replica decreases or increases with the root of the current flow time of the individual branches of the rectifier.

The thermal replica further comprises a first Zener diode coupling the input of the signal generator to the capacitor of the RC component of the thermal replica and a second Zener diode having a higher Zener voltage then the first Zener diode coupling the input of the signal generator to the output of the current means.

The variable resistance means of the RC component of the thermal replica comprises transistor means. The signal generator comprises a bistable multivibrator or a monostable multivibrator.

A switch is connected between the current supply means and the rectifier. A switching device for controlling the switch electrically is connected to the output of the signal generator whereby the signal generator controls the operation of the switch. The switch remains in its operative condition only for the duration of an output signal produced by the signal generator.

The bistable multivibrator has a reset input. A source of reset voltage is provided and manual switch means connects the source of reset voltage to the reset input of the bistable multivibrator.

In order that the invention may be readily carried into effect, it will now be described with reference to the accompanying drawings, wherein.

In the figures, the same components are identified by the same reference numerals.

Figure 1:
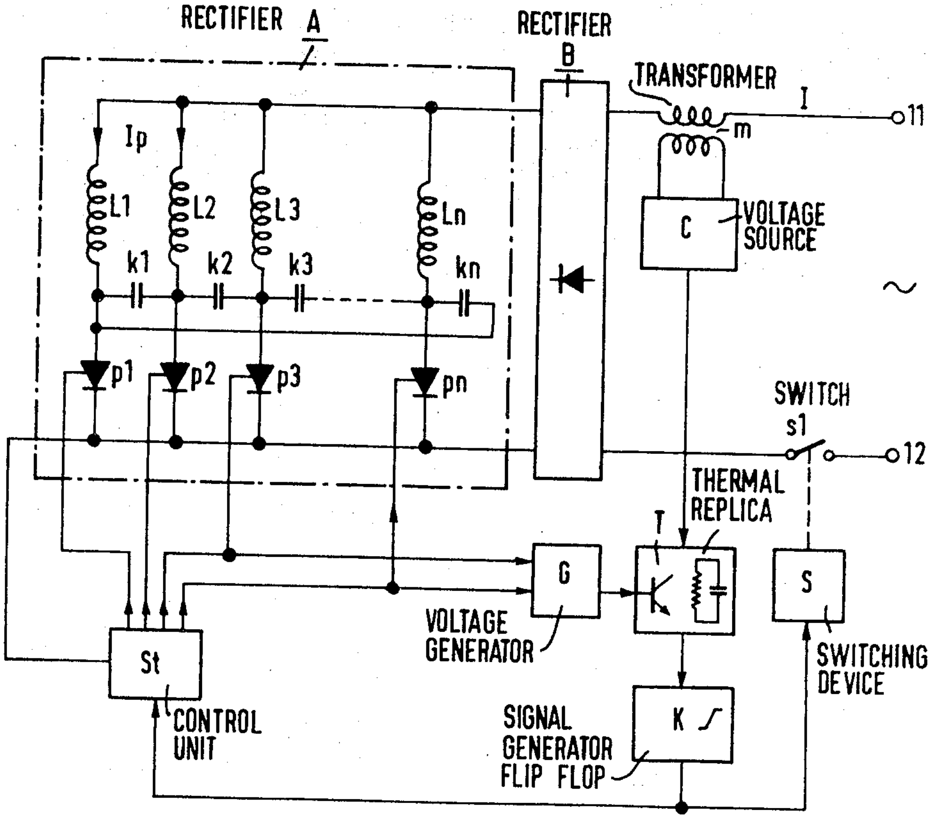
FIG. 1 is a block diagram of an embodiment of a rectifier having semiconductor valve-type components and an embodiment of the supervisory device of the invention utilized therewith.

In the embodiment of FIG. 1, a rectifier A has four branches connected in parallel with each other. The four branches of the rectifier A are connected via a rectifier B, a current transformer *m* and a switch *sl* to terminals 11 and 12 of an AC voltage power source. Each of the four branches of the rectifier A comprises an induction winding L1, L2, L3, . . . . L*n*, connected in series with a corresponding one of a plurality of thyristors *p*1, *p*2, *p*3, . . . . *pn*. A common point in the connection between the induction winding and the thyristor of each branch of the rectifier A is connected via a corresponding one of a plurality of commutation capacitors *k*1, *k*2, *k*3, . . . . *kn* to the common point in the connection between the induction winding and the thyristor of the next succeeding one of said branches.

Thus, the branches of the rectifier A follow each other in the order of the commutating cycle and comprise the winding L1 connected in series circuit arrangement with the thyristor *p*1, the winding L2 connected in series circuit arrangement with the thyristor *p*2, the winding L3 connected in series circuit arrangement with the thyristor *p*3, . . . . the winding L*n* connected in series circuit arrangement with the thyristor *pn*. The commutation capacitor *k*1 connects a common point in the connection between the winding L1 and the thyristor *p*1 to a common point in the connection between the winding L2 and the thyristor *p*2. The commutation capacitor *K*2 connects the common point in the connection between the winding L2 and the thyristor *p*2 to a common point in the connection between the winding L3 and the thyristor *p*3, and so on. The windings L1 to L*n* may be the winding of an inverter rectifier transformer or, in the present embodiment, may comprise the mutually displaced windings of a synchronous machine.

A control unit St has a plurality of output leads, each connected to the control electrode of a corresponding one of the thyristors *p*1, *p*2, *p*3, . . . . pn of the rectifier A. The control unit St controls the operation of the thyristors *p*1 to *pn*. More particularly, the sequence frequency of the control pulses of the thyristors *p*1 to *pn* may be determined in a known manner by the position of the rotor of the synchronous machine, the windings of which are the windings L1 to L*n*. The synchronous machine is scanned magnetically, optically or capacitively. The speed of the synchronous machine does not depend upon the load, in this case.

A voltage which, as desired, depends upon the duration of the current flow within the individual branches of the rectifier A, is provided by utilizing a voltage generator G. The voltage generator G has a pair of inputs connected to a pair of corresponding outputs of the control unit St. The control unit St thus supplies the control pulses for two of the rectifier branches, in succession in the commutating cycle, to the voltage generator G.

Figure 2:
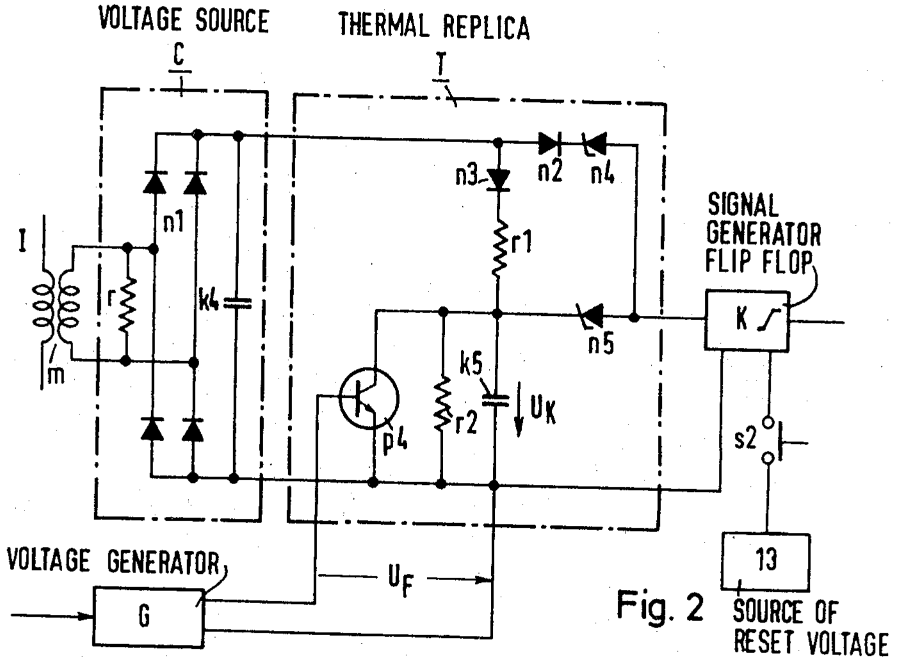
FIG. 2 is a circuit diagram of an embodiment of the voltage source C and the thermal replica T of the embodiment of FIG. 1.
Figure 3:
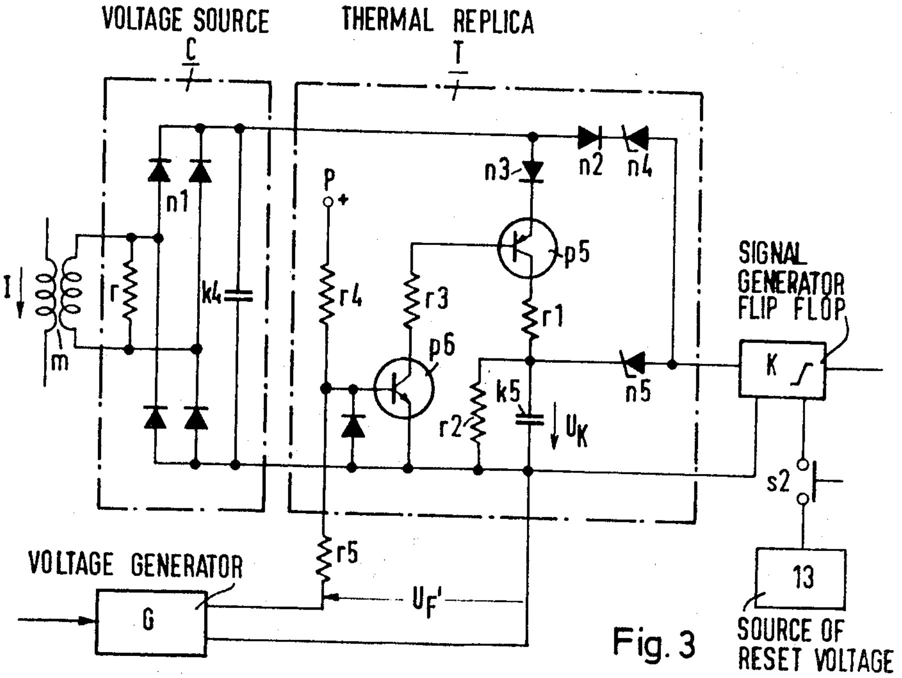
FIG. 3 is a circuit diagram of another embodiment of the voltage source C and the thermal replica T of the embodiment of FIG. 1.

The voltage generator G may comprise, for example, a tachometer coupled to the rotor of the synchronous machine. The voltage produced by the voltage generator G is applied to a thermal replica T. One input of the thermal replica T is connected to the output of the generator G and another input of said thermal replica is connected to the output of a voltage source C. The thermal replica T has an output which is connected to the input of a signal generator K. The voltage source C has an input connected to the secondary winding of the transformer *m* and substantially comprises a load resistor *r*, a full-wave rectifier *n*1 and a smoothing capacitor *k*4, as shown in FIGS. 2 and 3. The voltage source C provides an output voltage which is proportional to the current I supplied to the rectifier A.

The signal generator K comprises a flip-flop, or bistable multivibrator. A switching device S has an input connected to the output of the signal generator K. The control unit St has an input connected to the output of the signal generator K. The output signal of the signal generator K thus functions to trigger the switching device S, which control the operation of the switch *s*1. The signal generator K also functions to block the supply of control pulses by the control unit St.

In FIG. 2, the output of the voltage source C is connected to a diode *n*3, a resistor *r*1 and a capacitor *k*5 connected in series circuit arrangement. The diode *n*3, the resistor *r*1 and the capacitor *k*5 are part of the thermal replica T. The thermal replica T further comprises a resistor *r*2 connected in parallel with the capacitor *k*5 and connected in parallel with the emitter-collector path of a transistor *p*4. The base-emitter path of the transistor *p*4 is connected to the output of the voltage generator G (FIG. 1). The voltage generator G applies a voltage $U_F$, which depends upon the operating frequency of the rectifier A (FIG. 1) and which decreases with a decreasing operating frequency. The voltage generator G may also apply a reverse or blocking current which is interrupted by control pulses of constant duration at the sequence frequency of the control pulses provided by the control unit St.

The thermal replica T further comprises a Zener diode *n*5. The input of the flip-flop K is connected to the capacitor *k*5 of the thermal replica T via the Zener diode *n*5. The flip-flop K is connected in parallel with the capacitor k5. The thermal replica T includes another Zener diode *n*4 and a diode *n*2. The input of the flip-flop K is connected to the voltage source C via the Zener diode *n*4 and the diode *n*2. The Zener diode *n*4 has a higher Zener voltage than the Zener diode *n*5.

The flip-flop K has another input connected to a source of reset voltage 13 via a manually operated switch *s*2. The source of reset voltage 13 applies a voltage which resets the flip-flop K. The time constant is provided by the RC component comprising the resistors *r*1 and *r*2, the transistor *p*4, the capacitor *k*5 and the Zener diode *n*5. The resistors *r*1 and *r*2, the transistor *p*4, the capacitor *k*5 and the Zener diode *n*5 are so tuned to each other and are so adjusted to the loadability of the semiconductor valve-type components or thyristors of the rectifier A, that the flip-flop K responds only when the voltage $U_k$ at the capacitor *k5* exceeds, by a specific magnitude, the voltage occurring during normal rated operation. The normal rated operation involves any predetermined frequency and current determined by the loadability of the semiconductor valve-type components or thyristors. This may result, for example, at an unvaried total current, from an increase in the current flow or on periods, at a lower operating frequency, since the transistor *p4* is less controlled under such circumstances. When the transistor *p4* is less controlled, its resistance is increased, so that the capacitor *k5* may be charged to a higher voltage, while the voltage of the voltage source C remains unchanged.

An increase in the voltage at the capacitor *k5* and triggering of the flip-flop K may also occur when the current I, and thus the voltage of the voltage source C (FIG. 1) increase accordingly, while the operating frequency remains unchanged. Conversely, such an increase would not trigger the flip-flop K if said increase in the total current were associated with a corresponding increase in operating frequency, which would cause an increase in the voltage $U_F$, and thus a greater control of the transistor *p4*, which would counteract an increase in the voltage $U_k$ at the capacitor *k5*. The limit of thermal loading of the semiconductor valves or thyristors of the branches of the rectifier A (FIG. 1) is reached at the higher operating frequency, only when the magnitude of the entire current of the rectifier is even higher. The supervisory device of FIG. 2 cannot perform its desired functions when the transistor p4 is alloyed. The supervisory device of FIG. 3 functions are desired, even when the transistor *p4* is alloyed. The embodiment of FIG. 3 differs from that of FIG. 2 only in that the charging of the capacitor *k5* is controlled with the assistance of a transistor *p5* connected between the diode *n3* and the resistor r1.

The control current of the transistor p5 of FIG. 3 passes through the diode *n3*, a resistor *r3* and the emitter-collector path of a transistor *p6*, from the terminals of the voltage generator G. The base-emitter path of the transistor *p6* is connected via a resistor *r4* to the positive pole P of a voltage source. The transistor *p6* is thus controlled by the voltage source P so that the transistor *p5* is fully controlled.

The voltage $U_F'$ provided by the voltage generator G, which increases with the operating frequency of the rectifier A (FIG. 1), is applied in a reverse or blocking sense, via a resistor *r5*, to the control path of the transistor *p6*. Thus, the effective resistance of the emitter-collector paths of the transistors *p5* and *p6* increases with the increasing operating frequency of the rectifier A. The voltage $U_K$ and the capacitor *k5* may therefore reach the critical magnitude or level necessary to trigger the flip-flop K, only at an appropriately high total current of the rectifier A, and therefore, an accordingly higher voltage of the voltage source C.

The voltage generator G may also deliver blockings pulses of constant duration at a sequence frequency corresponding to the sequence frequency of the control pulses provided by the control unit St to the rectifier A (FIG. 1).

In both embodiments of FIGS. 2 and 3, the input of the flip-flop K is connected directly to the terminals of the voltage source C via the diode *n2* and the Zener diode *n4*. The Zener diode *n4* is so rated that, regardless of the corresponding operating frequency of the rectifier A, the flip-flop K responds, without delay, to an upper critical magnitude or level determined by the rating of said Zener diode.

In the embodiment of FIG. 1, the switch *s1*, between the source of energy and the rectifier A, is opened when the flip-flop K responds. If the flip-flop K is a bistable multivibrator, the switch *s1* remains open until said flip-flop is reset by the manual closing of the switch *s2* (FIGS. 2 and 3).

The fip-flop K may comprise a monostable multivibrator. If the flip-flop K is a monostable multivibrator, the switch *s1* is opened when said flip-flop responds and is closed after the reset time of said flip-flop. If the critical operating conditions indicated by the thermal replica T still prevail, the flip-flop K responds again and open the switch *s1* again, for the duration of the reset time of the monostable multivibrator K.

While the invention has been described by means of specific examples and in specific embodiments, we do not wish to be limited thereto, for obvious modifications will occur to those skilled in the art without departing from the spirit and scope of the invention.

We claim:

1. A supervisory device for protecting current-conducting controllable semiconductor rectifiers of a rectifier from thermal overloading, said supervisory device comprising a transformer connected to sense the current through the semiconductor rectifiers; a full-wave rectifier; resistance-capacitance circuit means connected to the rectifier via said transformer and said full-wave rectifier, said resistance-capacitance circuit means comprising a capacitor and at least one controllable semiconductor resistor coupled to said capacitor and having a control circuit; switching means coupled to said resistance-capacitance circuit; and a generator for reproducing the frequency of the rectifier connected to the semiconductor resistor of the resistance-capacitance circuit means.

2. A supervisory device as claimed in claim 1, wherein the generator produces a forward control voltage which varies as the frequency of the rectifier, the capacitor of the resistance-capacitance circuit means has a discharge circuit, the semiconductor resistor of the resistance-capacitance circuit means is connected in the discharge circuit of the capacitor, and the forward control voltage produced by the generator is applied to the control circuit of the semiconductor resistor.

3. A supervisory device as claimed in claim 1, wherein the capacitor of the resistance-capacitance circuit means has a charging circuit and the generator produces a constant forward control voltage and a blocking control voltage which vary as the frequency of the generator, and wherein the semiconductor resistor of the resistance-capacitance circuit is connected in the charging circuit of the capacitor and the difference voltage of the constant forward control voltage and the blocking control voltage produced by the generator is applied to the control circuit of the semiconductor resistor.

4. A supervisory device as claimed in claim 1, further comprising a signal generator coupled between the resistance-capacitance circuit means and the switching means, and wherein the resistance-capacitance circuit means further comprises a first Zener diode connected between the capacitor of the resistance-capacitance circuit means and the signal generator.

5. A supervisory device as claimed in claim 3, wherein the resistance-capacitance circuit means further comprises a resistor connected in series circuit arrangement with the semiconductor resistor and the capacitor, another resistor connected in parallel with the series circuit arrangement, a transistor and a limiting resistor connected in series circuit arrangement with the transistor in the control circuit of the semiconductor resistor.

6. A supervisory device as claimed in claim 4, wherein the resistance-capacitance circuit means further comprises a second Zener diode having a higher Zener voltage that the first Zener diode coupled between the full-wave rectifier and the signal generator.

7. A supervisory device as claimed in claim 5, wherein the semiconductor resistor comprises transistor.

8. A supervisory device as claimed in claim 4, wherein said signal generator comprises a bistable multivibrator.

9. A supervisory device as claimed in claim 4, wherein said signal generator comprises a monostable multivibrator.

10. A supervisory device as claimed in claim 8, wherein said bistable multivibrator has a reset input, and further comprising a source of reset voltage and manual switch means connecting said source of reset voltage to the reset input of said bistable multivibrator.

* * * * *